(12) United States Patent
Shang et al.

(10) Patent No.: US 9,588,782 B2
(45) Date of Patent: Mar. 7, 2017

(54) METHOD AND DEVICE FOR PROCESSING A WINDOW TASK

(71) Applicant: TENCENT TECHNOLOGY (SHENZHEN) COMPANY LIMITED, Shenzhen (CN)

(72) Inventors: Zifeng Shang, Shenzhen (CN); Xuemin Ma, Shenzhen (CN)

(73) Assignee: Tencent Technology (Shenzhen) Company Limited, Shenzhen (CN)

(*) Notice: Subject to any disclaimer, the term of this patent is extended or adjusted under 35 U.S.C. 154(b) by 316 days.

(21) Appl. No.: 14/284,691

(22) Filed: May 22, 2014

(65) Prior Publication Data
US 2014/0282598 A1 Sep. 18, 2014

Related U.S. Application Data

(63) Continuation of application No. PCT/CN2013/088455, filed on Dec. 3, 2013.

(30) Foreign Application Priority Data

Mar. 18, 2013 (CN) .......................... 2013 1 0086296

(51) Int. Cl.
G06F 9/46 (2006.01)
G06F 9/44 (2006.01)

(52) U.S. Cl.
CPC .................................. *G06F 9/4443* (2013.01)

(58) Field of Classification Search
None
See application file for complete search history.

(56) References Cited

U.S. PATENT DOCUMENTS 5,619,638 A * 4/1997 Duggan ................ G06F 9/4443 715/775
7,441,233 B1 * 10/2008 Orndorff ............... G06F 9/4443 717/107

FOREIGN PATENT DOCUMENTS

| CN | 101315657 A | 12/2008 |
|---|---|---|
| CN | 102665130 A | 9/2012 |
| KR | 100857824 B1 | 9/2008 |

OTHER PUBLICATIONS

International Search Report and Written Opinion issued in Counterpart International Application No. PCT/CN2013/088455 dated Mar. 6, 2014.

* cited by examiner

*Primary Examiner* — Kenneth Tang
(74) *Attorney, Agent, or Firm* — Fitzpatrick, Cella, Harper & Scinto

(57) ABSTRACT

A method and a device for processing a window task are provided. The method includes: creating a thread class including a first member variable for representing whether a task processed currently has been cancelled and a first member function for initiating a backstage thread; creating a backstage thread object based on the thread class when a task that takes time needs to be processed, and initializing the first member variable in the backstage thread object as FALSE, invoking the first member function in the backstage thread object to initiate the backstage thread; in process of the backstage thread processing the task that takes time, if a close instruction for a current window is received, setting the first member variable in the backstage thread object as TRUE to release the memory space occupied by the backstage thread object and closing the current window.

19 Claims, 4 Drawing Sheets

METHOD AND DEVICE FOR PROCESSING A WINDOW TASK

This application is a continuation of International Application No. PCT/CN2013/088455 filed on Dec. 3, 2013, which claims priority to Chinese Patent Application No. 201310086296.9 filed on Mar. 18, 2013, the contents of which are incorporated by reference herein in their entirety.

FIELD OF THE INVENTION

The present disclosure relates to a technical field of information processing, and in particular relates to a method and device for processing a window task.

DESCRIPTION OF THE PRIOR ART

A so-called window suspended animation is because the time for a window thread to process a certain task is too long, which causes a problem that processed results are unable to be returned in time, and as a result, a window interface is not refreshed, and there is no response when any button is clicked on.

The related art adopts a method of initiating a backstage thread and processing a task that take times (a task for which processing time exceeds a preset period of time) by the backstage thread to solve the problem of the window suspended animation to a certain degree. However, in a process of the backstage thread processing the task that takes time in the related art, if the window is wanted to be closed, it can be closed only after the backstage thread has finished the processing of the task that takes time, which causes that the close of the window can't be responded to in time.

BRIEF DESCRIPTION OF THE INVENTION

A embodiment of the present disclosure provides a method for processing a window task, the method including: creating a thread class including a first member variable for representing whether a task processed currently is cancelled and a first member function for initiating a backstage thread; creating a backstage thread object based on the thread class when a task that takes time needs to be processed and initializing the first member variable in the backstage thread object as FALSE, and invoking the first member function in the backstage thread object to initiate the backstage thread to process the task that takes time; and in the process of the backstage thread processing the task that takes time, setting the first member variable in the backstage thread object as TRUE to notify the backstage thread that the task processed currently has been cancelled if a close instruction for a current window is received, and releasing a memory space occupied by the backstage thread object and closing the current window.

Another embodiment of the present disclosure provides a device for processing a window task, the device including: a creating unit configured to create a thread class including a first member variable for representing whether a task processed currently is cancelled and a first member function for initiating a backstage thread; a first processing unit configured to create a backstage thread object based on the thread class when a task that takes time needs to be processed and initialize the first member variable in the backstage thread object as FALSE, and invoke the first member function in the backstage thread object to initiate the backstage thread to process the task that takes time; and a window closing unit configured to, in the process of the backstage thread processing the task that takes time, set the first member variable in the backstage thread object as TRUE to notify the backstage thread that the task processed currently has been cancelled if a close instruction for a current window is received, and release a memory space occupied by the backstage thread object and close the current window.

Since the backstage thread object of the embodiments of the present disclosure is created based on the created thread class, the backstage thread initiated by the backstage thread object invoking the first member function and a window thread are two independent threads, and thus in the process of the backstage thread processing the task that takes time in the embodiments of the present disclosure, if the close instruction for the current window is received, the current window can be closed directly by the window thread, which increases a response speed of the close of the window significantly. At the same time, in order to notify the backstage thread to quit as soon as possible, the backstage thread may be notified by an identification representing that the task processed currently has been cancelled, and the backstage thread can quit after receiving the notice and release the memory space occupied by the backstage thread object.

BRIEF DESCRIPTION OF THE DRAWINGS

In order to explain technical solutions in the embodiments of the present disclosure clearer, accompanying drawings to be used in descriptions of the embodiments or the related art are described briefly, and it is obvious that the accompanying drawings in the following description are only some embodiments of the present disclosure, and for those skilled in the art, other accompanying drawings can be obtained according to these accompanying drawings without inventive labor.

DESCRIPTION OF EMBODIMENT

In order to make purposes, the technical solutions and advantages of the present disclosure clearer, the present disclosure is further described in detail in combination with the accompanying drawings and the embodiments. It is understood that the specific embodiments described here is only for explaining the present disclosure, but not for limiting the present disclosure.

Now the technical solutions of the present disclosure will be explained through the specific embodiments.

Embodiment One

Figure 1:
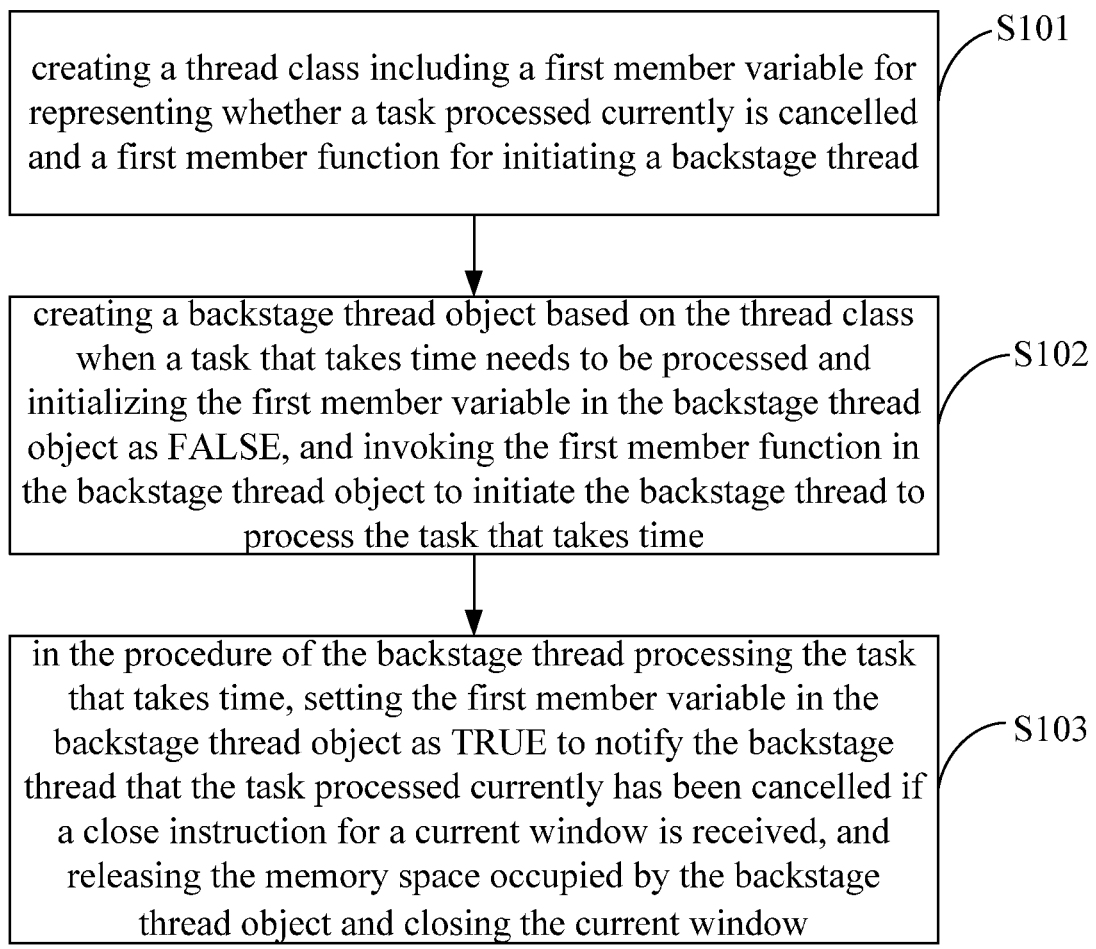
FIG. 1 is a flow chart of an implementation of a method for processing a window task provided by Embodiment one of the present disclosure.

FIG. 1 shows a flow of an implementation of a method for processing a window task provided by Embodiment one of the present disclosure. The process of the method is described in detail as follows.

In step S101, a thread class is created.

In this embodiment, the thread class (for example, CThread) includes a customized first member variable (for example, m_bCancel), a second member variable (for example, m_hwnd), and a first member function (for example, StartThread( )). The first member variable is used for representing whether a task processed currently is cancelled, the second member variable represents a window handle for receiving a processing result, and the first member function is used for initiating a backstage thread.

A purpose of defining the first member variable in the present embodiment is that, when a window is closed, in order to notify the backstage thread to quit as soon as possible, an identification (for example, m_bCancel) is needed to show that the task processed currently has been cancelled.

A purpose of defining the second member variable in the present embodiment is that, when the backstage thread has finished processing of a current task, a processing result can be sent to a window corresponding to the window handle.

In step S102, a backstage thread object is created based on the thread class when a task that takes time needs to be processed and the first member variable in the backstage thread object is initialized as FALSE, and the first member function in the backstage thread object is invoked to initiate the backstage thread to process the task that takes time.

In this embodiment, when the task that takes time (i.e., the time for processing the task is larger than a preset value) needs to be processed, the backstage thread object (for example, CThread *m_pThread) is created based on the thread class, and since the backstage thread object is created based on the thread class, the backstage thread object includes the first member variable (for example, m_bCancel), the second member variable (for example, m_hWnd), and the first member function defined by the thread class. The first member variable of the backstage thread object is initialized as FALSE, the second member variable is assigned the handle of the current window, and the first member function (for example, m_pThread→StartThread( )) is invoked to initiate the backstage thread to process the task that takes time. Since the backstage thread object is created based on the created thread class, the backstage thread which is initiated by the backstage thread object invoking the first member function is a thread that runs independently, that is, the backstage thread and a window thread (which is a thread that operating system window controls per se have) are two independent threads, and the backstage thread carries out communication with the window thread by a message function (for example, SendMessage or PostMessage).

It needs to be explained that the first member variable (for example, m_bCancel), and the second member variable (for example, m_hWnd) defined in the thread class are used for representing attributes that the thread class has and are initialized as null; the defined first member function (for example, StartThread( )) is used for representing functions that the thread class has, and when the backstage thread object is created based on the thread class, i.e., after an instantiation operation is performed on the thread class, the first member variable (for example, m_bCancel) and the second member variable (for example, m_hWnd) defined are given specific values, and the defined first member function is invoked and executed. Preferably, the initiated backstage thread is a new thread created by a system function (for example, CreateThread( )) or a thread that exists in a system thread pool.

Further, it needs to be explained that since a lifetime of a thread is controlled in the related art, only a thread created by itself can be used by saving thread handle HANDLE hHandle, and a system function "DWORD WaitForSingleObject(HANDLE hHandle, DWORD dwMilliseconds); and BOOL TerminateThread(HANDLE hThread, DWORD dwExitCode)"

is used to wait the thread to quit or terminate the thread enforcedly.

However, since the thread in the system thread pool can't acquire the thread handle HANDLE hHandle after initiated, the quit of the thread can't be controlled and the thread in the thread pool can't be used to process a task in the related art.

Since the present embodiment separates the backstage thread from the window thread, the backstage thread can quit before or after the window is closed and no control is needed after the backstage thread is initiated, thus a following system function "BOOL WINAPI QueueUserWorkItem(
 _in     LPTHREAD_START_ROUTINE Function,
 _in     PVOID Context,
 _in     ULONG Flags
)"

can be used to invoke the thread in the system thread pool directly to process a task, so as to increase processing efficiency of the task effectively.

Further, it also needs to be explained that the backstage thread in the present embodiment is a temporary thread for processing the task that takes time, and it can quit after the processing of the task that takes time is finished. The window thread is used for processing window messages of all windows created by the window thread.

The first member variable in the backstage thread object is initialized as FALSE in the present embodiment, which represents that the task processed currently has not been cancelled.

In step S103, in the process of the backstage thread processing the task that takes time, the first member variable in the backstage thread object is set as TRUE to notify the backstage thread that the task processed currently has been cancelled if a close instruction for the current window is received, and a memory space occupied by the backstage thread object is released and the current window is closed.

In the present embodiment, since the backstage thread and the window thread are two independent threads, in the process of the backstage thread processing the task that takes time, if the close instruction for the current window is received, the current window can be closed directly by the window thread. Preferably, in order to notify the backstage thread to quit as soon as possible, the present embodiment further includes, at the same time of closing the current window, setting the first member variable in the backstage thread object as TRUE, that is, notifying the backstage thread that the task processed currently has been cancelled so that the backstage thread quits as soon as possible, and the memory space occupied by the backstage thread object is released.

Further, the present embodiment may also include the following step.

After the backstage thread has finished the processing of the task that takes time to obtain a processing result, if the first member variable in the backstage thread object is FALSE and the current window has not been closed (for example, IsWindow (m_hWnd)), the processing result is sent to the current window, so that the current window updates a window display status (for example, magnifies, reduces, hides the window or the like) after having received the processing result.

In the present embodiment, sending the processing result to the current window specifically includes: sending the processing result to the current window by a message function (for example, SendMessage or PostMessage), which includes a first parameter, a second parameter, a third parameter, and a fourth parameter.

The first parameter is used for representing a window handle for receiving the processing result.

The second parameter is for representing the processing result.

The third parameter and the fourth parameter are used for representing additional information respectively.

It needs to be explained that the SendMessage function in the present embodiment is to send a specified message to one or more windows. This function invokes a window program for a specified window until the window program has finished processing of the message and then returns. In contrast, a PostMessage function in the related art returns immediately after transmitting a message to a message queue of one thread.

An example of a prototype of the SendMessage function is as follows:

LRESULT SendMessage (HWND hWnd, UINT Msg, WPARAM wParam, LPARAM IParam).

Parameters:

hWnd represents a window handle for receiving a message (for example, the processing result). If this parameter is HWND_BROADCAST, the message is sent to all top-layer windows including an invalid or invisible window that is not created by a current window thread, a covered window, and a pop-up window, but the message is not sent to a sub-window.

Msg specifies the message sent.

wParam specifies a specific information for an additional message.

IParam specifies a specific information for an additional message.

Return value specifies a result of processing the message, which depends on the message sent.

SendMessage is a synchronization function, and the invoking returns only after the window thread has finished the processing of the message sent.

Further, the present embodiment may also include: notifying the current window before the backstage thread quits so that the current window sets the backstage thread object as null after receiving the notice.

In the present embodiment, before the backstage thread quits, the window thread is notified to quit by SendMessage (m_hWnd, WM_THREADEXIT,0,0), and the window thread sets the backstage thread object as null after receiving the notice to release the memory space occupied by the backstage thread object.

In this embodiment, since the backstage thread runs independently of the window thread, only the backstage thread may be notified to quit when the window is closed, and the window can be closed at the same time of notice without waiting the backstage thread to quit. Additionally, the backstage thread runs independent of the window, thus after the window is closed, the backstage thread can run continuously. Moreover, the processing result of the backstage thread can be send to the window by the function SendMessage, so as to ensure that a front-stage display is synchronized with the backstage data processing. Furthermore, either of the backstage thread created by oneself or the backstage thread in the system thread pool can be used.

Embodiment Two

Figure 2:
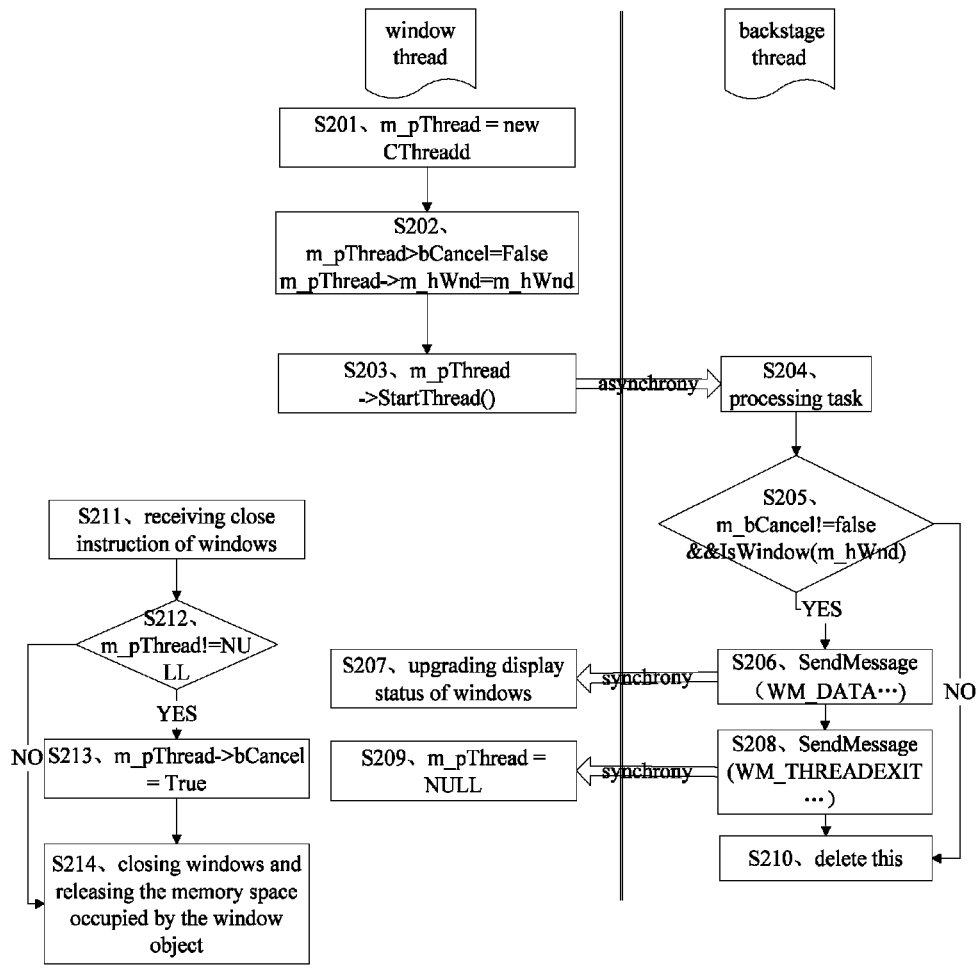
FIG. 2 is a specific flow chart of a method for processing a window task provided by Embodiment two of the present disclosure.

FIG. 2 illustrates a specific process of a method for processing a window task provided by Embodiment two of the present disclosure, and a process of the method is described in detail as follows.

In step S201, the backstage thread object m_pThread is instantiated based on the created thread class CThread, i.e., m_pThread=new Cthread.

In step S202, the member variable in the backstage thread object is initialized, i.e., m_pThread→bCancel=False, which represents that the task processed currently has not been cancelled; and m_pThread→m_hWnd=m_hWnd, which represents the window handle for receiving processing result;

In step S203, m_pThread→StartThread( ) is invoked to initiate the backstage thread to process a task.

In step S204, the initiated backstage thread processes the task.

In step S205, it is decided whether m_bCancel is FALSE and whether the current window is not closed, i.e., m_pThread!=FALSE&&IsWindow (m_hWnd), and if so, step S206 is executed, otherwise step S210 is executed.

In step S206, the backstage thread sends the processing result to the window thread through the SendMessage (m_hWnd, WM_DATA, 0 . . . ) function.

In step S207, the window thread updates the window display status after receiving the processing result.

In step S208, the backstage thread notifies the window thread to quit through the SendMessage (m_hWnd, WM_THREADEXIT, 0, 0) function before quitting.

In step S209, the window thread sets the backstage thread object as null after receiving the notice, i.e., m_pThread=NULL.

In step S210, the memory space occupied by the backstage thread object is released, i.e., delete this.

In step S211, a window close instruction is received.

In step S212, it is decided whether the backstage thread object is not null, i.e., m_pThread!=NULL, and if so, step S213 is executed, otherwise step S214 is executed.

In step S213, m_pThread→bCancel is set as TRUE, which represents the task processed currently has been cancelled.

In step S214, the window is closed and the content space occupied by the window object is released.

Embodiment Three

Figure 3:
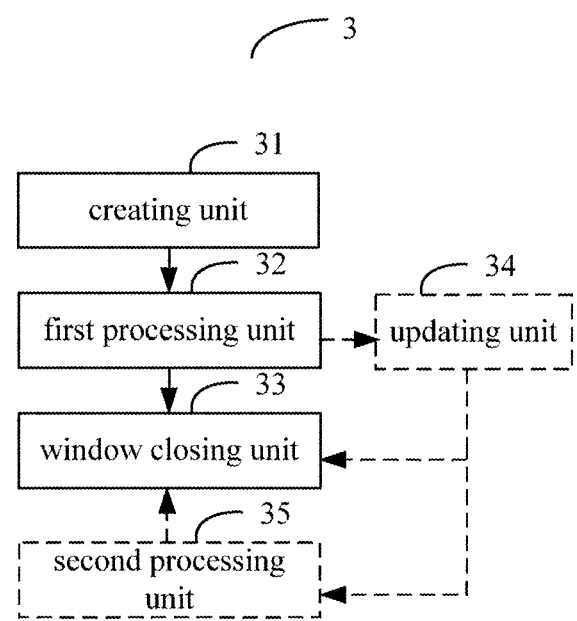
FIG. 3 is a structural diagram of a constitution of a device for processing a window task provided by Embodiment three of the present disclosure.

FIG. 3 illustrates a structure of a constitution of a device for processing a window task provided by Embodiment three of the present disclosure, and for the convenience of explanation, only parts related to the embodiment of the present disclosure are illustrated.

The device 3 for processing the window task may be a software unit, a hardware unit, or a unit that combines software and hardware, which runs in a terminal apparatus, or may be an independent plug-in integrated into the terminal apparatus or an application system running in the terminal apparatus.

The device 3 for processing the window task includes a creating unit 31, a first processing unit 32, and a window closing unit 33.

The creating unit 31 is configures to create a thread class including a first member variable for representing whether a task processed currently is cancelled and a first member function for initiating backstage thread.

The first processing unit 32 is configured to create a backstage thread object based on the thread class when a task that takes time needs to be processed and initialize the first member variable in the backstage thread object as FALSE, and invoke the first member function in the backstage thread object to initiate the backstage thread to process the task that takes time.

The window closing unit 33 is configured to, in the process of the backstage thread processing the task that takes time, set the first member variable in the backstage thread object as TRUE to notify the backstage thread that the task processed currently has been cancelled if a close instruction for current window is received, and release a memory space occupied by the backstage thread object and close the current window.

Further, the device 3 may include an updating unit 34 configured to send a processing result to the current window if the first member variable in the backstage thread object is FALSE and the current window is not closed after the backstage thread has finished the processing of the task that takes time, so that the current window updates a window display status after receiving the processing result.

Further, the updating unit 34 is specifically configured to send the processing result to the current window by a message function including a first parameter, a second parameter, a third parameter, and a fourth parameter.

The first parameter is used for representing a window handle for receiving the processing result.

The second parameter is used for representing the processing result.

The third parameter and the fourth parameter are used for representing additional information respectively.

Further, the device 3 may include a second processing unit 35 configured to notify the current window before the backstage thread quits so that the current window sets the backstage thread object as null after receiving the notice.

In the present embodiment, the initiated backstage thread is a new thread created by a system function or a thread existing in a system thread pool.

Those skilled in the art can understand that, the above division of the respective functional units are used as an example for convenience and simplicity of the descriptions, and in practical applications, the above-described functions can be assigned to different functional units to be performed as necessary, that is, the internal structure of the device for processing the window task can be divided into different functional units or modules to perform all or a part of the above-described functions. The respective functional units in the embodiment can be integrated into one processing unit or exist physically and individually, or two or more units may be integrated into one unit. The above-described integrated units can be implemented in a hardware form, or in a form of software functional units. Further, the specific names of the respective functional units are used for convenience of being distinguished with each other, not for limiting the scope sought for protection by this application. For the specific operational processes of the units in the above-described device, please refer to the corresponding process in the above embodiments of the methods, and detailed descriptions thereof are omitted here.

In summary, in the embodiments of the present disclosure, the backstage thread and the window thread run independently, and when the window is closed, only the backstage thread is notified to quit, and the window can be closed at the same time of the notice without waiting the backstage thread to quit, which increases a response speed of the close of the window significantly. And, the processing result of the backstage thread can be sent to the window by the message function SendMessage or PostMessage, so as to ensure synchronization between the front-stage display and the backstage data processing. Further, the initiated backstage thread may be the backstage thread created by oneself, or may be the backstage thread in the system thread pool. When there is an idle backstage thread in the thread pool, processing efficiency of the task can be increased by invoking the backstage thread in the thread pool directly.

Those skilled in the art can understand that, all or a part of steps for implementing the methods of the above-described embodiments can be completed by instructing related hardware through a program, and the program can be stored in a computer readable storage medium including a ROM/RAM, a disk, an optical disk or the like.

Figure 4:
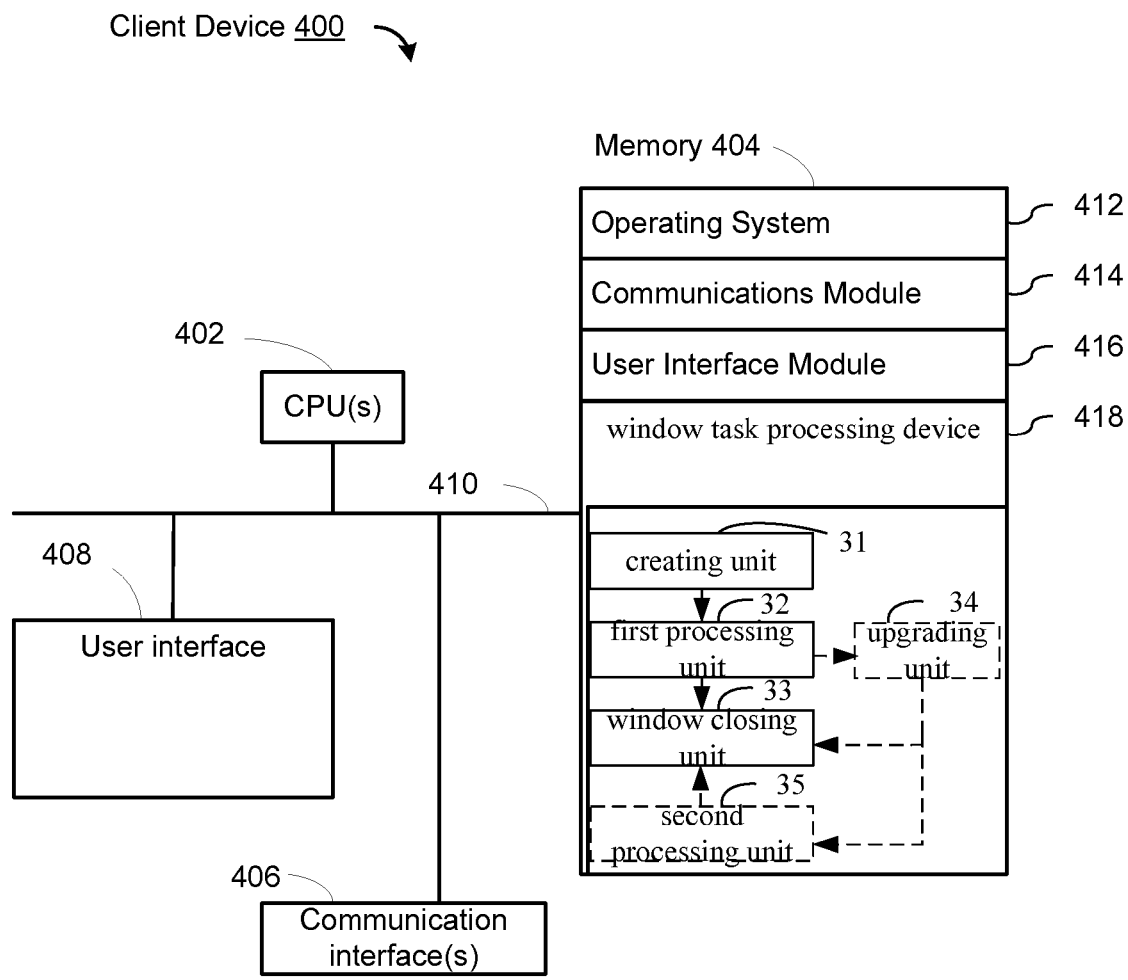
FIG. 4 is a block diagram of an exemplary client device 400 comprising a window task processing device for processing a window task.

FIG. 4 illustrates a block diagram of an exemplary client device 400 comprising the window task processing device for processing a window task, which may be used in the above embodiments of the present disclosure. In accordance with various embodiments of the present disclosure, the client device 400 may be applied to implement the methods as shown in FIGS. 1 and 2. In some implementations, the client device 400 may at least include one or more processors 402 (e.g., central processing units) and a memory 404 for storing programs and instructions for execution by the one or more processors 402. In some implementations, the client device 400 may further include one or more communications interfaces 406, a user interface 408, and one or more communications buses 410 that interconnect these components.

In some embodiments, the communication buses 410 include circuitry (sometimes called a chipset) that interconnects and controls communications between system components. In some embodiments, the memory 404 includes high-speed random access memories, such as DRAM, SRAM, DDR RAM or other random access solid state memory devices, and optionally includes non-volatile memory, such as one or more magnetic disk storage devices, optical disk storage devices, flash memory devices, or other non-volatile solid state storage devices. In some embodiments, the memory 404 includes one or more storage devices remotely located from the one or more processors 402. In some embodiments, the memory 404, or alternatively the non-volatile memory device(s) within the memory 404, includes a non-transitory computer readable storage medium.

In some embodiments, the memory 404 or alternatively the non-transitory computer readable storage medium of the memory 404 stores the following programs, modules and data structures, instructions, or a subset thereof:

An operating System 412 that includes processes for handling various basic system services and for performing hardware dependent tasks.

A communication module 414 that is used for connecting the client device 400 to other machines via a local network or servers (e.g., a remote music server) via one or more network communication interfaces 408 (wired or wireless) and one or more communication networks, such as the Internet, other wide area networks, local area networks, metropolitan area networks, and so on.

A user interface module 416 that includes processes for handling various basic input and output functions through one or more input and output devices.

A window task processing device 418 that executes instructions in a software application and therefore operates on different data sets.

Those skilled in the art can understand that, the window task processing device 418 shown in FIG. 4 may be the same as the window task processing device 3 shown in FIG. 3.

In some implementations, the window task processing device 3 may includes a creating unit 31 configured to create a thread class including a first member variable for representing whether a task processed currently is cancelled and a first member function for initiating a backstage thread; a first processing unit 32 configured to create a backstage thread object based on the thread class when a task that takes time needs to be processed and initialize the first member variable in the backstage thread object as FALSE, and invoke the first member function in the backstage thread object to initiate the backstage thread to process the task that takes time; and a window closing unit 33 configured to, in the process of the backstage thread processing the task that takes time, set the first member variable in the backstage thread object as TRUE to notify the backstage thread that the task processed currently has been cancelled if a close instruction for a current window is received, and release a memory space occupied by the backstage thread object and close the current window.

The device 3 may further include an updating unit 34 configured to send a processing result to the current window if the first member variable in the backstage thread object is FALSE and the current window is not closed after the backstage thread has finished the processing of the task that takes time, so that the current window updates a window display status after receiving the processing result.

In some implementations, the updating unit may be specifically configured to send the processing result to the current window by a message function including a first parameter, a second parameter, a third parameter, and a fourth parameter.

The first parameter is used for representing a window handle for receiving the processing result.

The second parameter is used for representing the processing result.

The third parameter and the fourth parameter are used for representing additional information respectively.

In some implementations, the device 3 may further include a second processing unit 35 configured to notify the current window before the backstage thread quits so that the current window sets the backstage thread object as null after receiving the notice.

In some implementations, the initiated backstage thread is a new thread created by a system function or a thread existing in a system thread pool.

The above content is a further detailed description made to the present disclosure in combination with the specific embodiments thereof, and the specific implementations of the present disclosure are not restricted to this explanation. For those skilled in the art, several equivalent alternations and obvious variations made without departing from the concept of the present disclosure and having same or similar performance or usage are regarded as belonging to the scope of patent protection determined by the submitted claims of the present disclosure.

The invention claimed is:

1. A method for processing a window task, comprising:
   creating a thread class including a first member variable for representing whether a task processed currently is cancelled and a first member function for initiating a backstage thread;
   creating a backstage thread object based on the thread class when a task that takes time needs to be processed and initialize the first member variable in the backstage thread object as FALSE, and invoking the first member function in the backstage thread object to initiate the backstage thread to process the task that takes time; and
   in the process of the backstage thread processing the task that takes time, setting the first member variable in the backstage thread object as TRUE to notify the backstage thread that the task processed currently has been cancelled if a close instruction for a current window is received, and releasing a memory space occupied by the backstage thread object and closing the current window.

2. The method according to claim 1, further comprising:
   sending a processing result to the current window if the first member variable in the backstage thread object is FALSE and the current window is not closed after the backstage thread has finished the processing of the task that takes time, so that the current window updates a window display status after receiving the processing result.

3. The method according to claim 2, wherein the sending the processing result to the current window specifically comprises:
   sending the processing result to the current window by a message function including a first parameter, a second parameter, a third parameter and a fourth parameter, the first parameter representing a window handle for receiving the processing result, the second parameter representing the processing result, and the third parameter and the fourth parameter representing additional information respectively.

4. The method according to claim 1, further comprising:
   notifying the current window before the backstage thread quits so that the current window sets the backstage thread object as null after receiving the notice.

5. The method according to claim 1, wherein the initiated backstage thread is a new thread created by a system function or a thread existing in a system thread pool.

6. The method according to claim 2, wherein the initiated backstage thread is a new thread created by a system function or a thread existing in a system thread pool.

7. The method according to claim 3, wherein the initiated backstage thread is a new thread created by a system function or a thread existing in a system thread pool.

8. The method according to claim 4, wherein the initiated backstage thread is a new thread created by a system function or a thread existing in a system thread pool.

9. A device for processing window task, comprising:
   a processor; and
   a memory storing instructions which, when executed by the processor, cause the processor to:
   create a thread class including a first member variable for representing whether a task processed currently is cancelled and a first member function for initiating a backstage thread;
   create a backstage thread object based on the thread class when a task that takes time needs to be processed and initialize the first member variable in the backstage thread object as FALSE, and invoke the first member function in the backstage thread object to initiate the backstage thread to process the task that takes time; and
   in the process of the backstage thread processing the task that takes time, set the first member variable in the backstage thread object as TRUE to notify the backstage thread that the task processed currently has been cancelled if a close instruction for a current window is received, and release memory space occupied by the backstage thread object and close the current window.

10. The device according to claim 9, wherein the instructions, when executed by the processor, further cause the processor to:
send a processing result to the current window if the first member variable in the backstage thread object is FALSE and the current window is not closed after the backstage thread has finished the processing of the task that takes time, so that the current window updates a window display status after receiving the processing result.

11. The device according to claim 10, wherein the instructions, when executed by the processor, further cause the processor to send the processing result to the current window by a message function including a first parameter, a second parameter, a third parameter, and a fourth parameter; the first parameter representing a window handle for receiving the processing result; the second parameter representing the processing result; and the third parameter and the fourth parameter representing additional information respectively.

12. The device according to claim 9, wherein the instructions, when executed by the processor, further cause the processor to:
a second processing unit configured to notify the current window before the backstage thread quits so that the current window sets the backstage thread object as null after receiving the notice.

13. The device according to claim 9, wherein the initiated backstage thread is a new thread created by a system function or a thread existing in a system thread pool.

14. The device according to claim 10, wherein the initiated backstage thread is a new thread created by a system function or a thread existing in a system thread pool.

15. The device according to claim 11, wherein the initiated backstage thread is a new thread created by a system function or a thread existing in a system thread pool.

16. The device according to claim 12, wherein the initiated backstage thread is a new thread created by a system function or a thread existing in a system thread pool.

17. A non-transitory computer-readable medium, having instructions stored thereon which, when executed by one or more processors, cause the processors to perform operations comprising:
creating a thread class including a first member variable for representing whether a task processed currently is cancelled and a first member function for initiating a backstage thread;
creating a backstage thread object based on the thread class when a task that takes time needs to be processed and initializing the first member variable in the backstage thread object as FALSE, and invoking the first member function in the backstage thread object to initiate the backstage thread to process the task that takes time; and
in the process of the backstage thread processing the task that takes time, setting the first member variable in the backstage thread object as TRUE to notify the backstage thread that the task processed currently has been cancelled if a close instruction for a current window is received, and releasing a memory space occupied by the backstage thread object and closing the current window.

18. The non-transitory computer-readable medium according to claim 17, wherein the operations further comprise:
sending a processing result to the current window if the first member variable in the backstage thread object is FALSE and the current window is not closed after the backstage thread has finished the processing of the task that takes time, so that the current window updates a window display status after receiving the processing result.

19. The non-transitory computer-readable medium according to claim 17, wherein the operations further comprise:
notifying the current window before the backstage thread quits so that the current window sets the backstage thread object as null after receiving the notice.

* * * * *